United States Patent
Schottler et al.

(10) Patent No.: US 7,456,828 B2
(45) Date of Patent: Nov. 25, 2008

(54) JOYSTICK DEVICE

(75) Inventors: Joseph J. Schottler, Crystal, MN (US); James D. Ryken, Maple Grove, MN (US)

(73) Assignee: Sauer-Danfoss Inc., Ames, IA (US)

( * ) Notice: Subject to any disclaimer, the term of this patent is extended or adjusted under 35 U.S.C. 154(b) by 682 days.

(21) Appl. No.: 10/847,981

(22) Filed: May 18, 2004

(65) Prior Publication Data

US 2005/0068295 A1    Mar. 31, 2005

Related U.S. Application Data

(60) Provisional application No. 60/507,320, filed on Sep. 30, 2003.

(51) Int. Cl.
  *G09G 5/00* (2006.01)

(52) U.S. Cl. .......... 345/204; 345/156; 345/168; 345/184

(58) Field of Classification Search .......... 345/156–158, 345/161, 163, 168, 179, 173, 31, 184, 182, 345/204; 700/249; 348/143; 180/333; 74/490.1; 340/825.69; 463/39; 378/114; 280/755, 280/771
  See application file for complete search history.

(56) References Cited

U.S. PATENT DOCUMENTS

| | | | |
|---|---|---|---|
| 4,766,581 A * | 8/1988 | Korn et al. ............. 369/30.4 |
| 4,964,062 A * | 10/1990 | Ubhayakar et al. ......... 700/249 |
| 5,220,592 A * | 6/1993 | Blouir ................ 378/114 |
| 5,560,256 A * | 10/1996 | Tines ................. 74/490.1 |
| 5,694,153 A * | 12/1997 | Aoyagi et al. ............. 345/161 |
| 5,701,478 A * | 12/1997 | Chen ................ 713/2 |
| 6,191,774 B1 * | 2/2001 | Schena et al. ............ 345/163 |
| 6,222,525 B1 * | 4/2001 | Armstrong ............... 345/161 |
| 6,353,431 B1 * | 3/2002 | Poole et al. .............. 345/161 |
| 6,366,274 B1 * | 4/2002 | Elledge ................ 345/163 |
| 6,392,693 B1 * | 5/2002 | Wakiyama et al. .......... 348/143 |
| 6,538,637 B1 * | 3/2003 | Kor .................. 345/156 |
| 6,550,562 B2 | 4/2003 | Brandt et al. |
| 7,265,750 B2 * | 9/2007 | Rosenberg ............... 345/182 |
| 2002/0070069 A1 * | 6/2002 | Brandt et al. ............ 180/333 |
| 2002/0097223 A1 * | 7/2002 | Rosenberg .............. 345/157 |
| 2003/0171190 A1 * | 9/2003 | Rice .................. 482/57 |
| 2003/0189547 A1 * | 10/2003 | Lee et al. ............. 345/161 |
| 2004/0048666 A1 * | 3/2004 | Bagley et al. ............ 463/39 |
| 2004/0150204 A1 * | 8/2004 | Goertzen et al. .......... 280/755 |
| 2005/0030278 A1 * | 2/2005 | Fu .................. 345/156 |
| 2005/0057031 A1 * | 3/2005 | Ahnafield ............. 280/771 |
| 2005/0104742 A1 * | 5/2005 | Phifer ............... 340/825.69 |

* cited by examiner

*Primary Examiner*—Prabodh Dharia

(57) ABSTRACT

A joystick device is provided that is in electronic communication with a remotely located main electronic controller used to control heavy machinery and the like. The joystick device includes a base assembly having a first microprocessor in electronic communication with the main electronic controller. The joystick device also includes a grip assembly pivotally connected to the base assembly. The grip assembly includes a plurality of input buttons and a second microprocessor in electronic communication with the first microprocessor. The joystick device further includes sensing elements that detect movement of the joystick device.

12 Claims, 3 Drawing Sheets

JOYSTICK DEVICE

CROSS REFERENCE TO A RELATED APPLICATION

This application is based upon Applicants' Provisional Patent Application Ser. No. 60/507,320 for "Joystick Device" filed Sep. 30, 2003.

BACKGROUND OF THE INVENTION

The present invention relates to control devices and, more specifically, joystick devices for controlling heavy machinery.

It is not uncommon for a piece of heavy machinery to be controlled by a joystick device. In such an arrangement, an operator grasps the joystick device and uses the device to steer the machine or perform other functions. Additionally, the joystick device may contain input buttons that allow the operator to control other functions of the machine. For example, in a lift truck, the joystick device may contain input buttons to allow the operator to control the movement and positioning of the lift arms.

The disadvantage of these joystick devices is that they require a plurality of electrical connections. Each of the input sources, including any input buttons and the grip itself, require electrical connections. Typically, each input requires power and ground connections to supply power as well as a data connection for sending an output signal to a remotely located main controller. As a result, conventional joystick devices typically employ many wires and cables, which tend to be bulky and compromise space.

U.S. Pat. No. 6,550,562 to Brandt et al. discloses a joystick controller that pivots from side to side and from front to back. In addition, the Brandt et al. device has a plurality of input buttons that control other functions of the vehicle, such as the turn signals, horn, and specific movements of the lift arms. All of these input buttons are electronically connected to a microprocessor disposed within the grip. The microprocessor combines all of these inputs and sends a single serial communication signal to a remotely located main controller that controls and drives the lift truck or other heavy machinery.

It is therefore a principal object of this invention to provide a joystick device that allows for a plurality of input buttons without the need for bulky wires and cables.

A further object of this invention is to provide a plurality of microprocessors in electrical communication with all of the input sources.

These and other objects will be apparent to those skilled in the art.

BRIEF SUMMARY OF THE INVENTION

The present invention is directed towards a joystick device in electronic communication with a remotely located main electronic controller used to control heavy machinery and the like. The joystick device includes a base assembly having a first microprocessor in electronic communication with the main electronic controller. The joystick device also includes a grip assembly pivotally connected to the base assembly. The grip assembly includes a plurality of input buttons and a second microprocessor in electronic communication with the first microprocessor. The joystick device further includes sensing elements for detecting movement of the joystick device.

DESCRIPTION OF THE INVENTION

Figure 1:
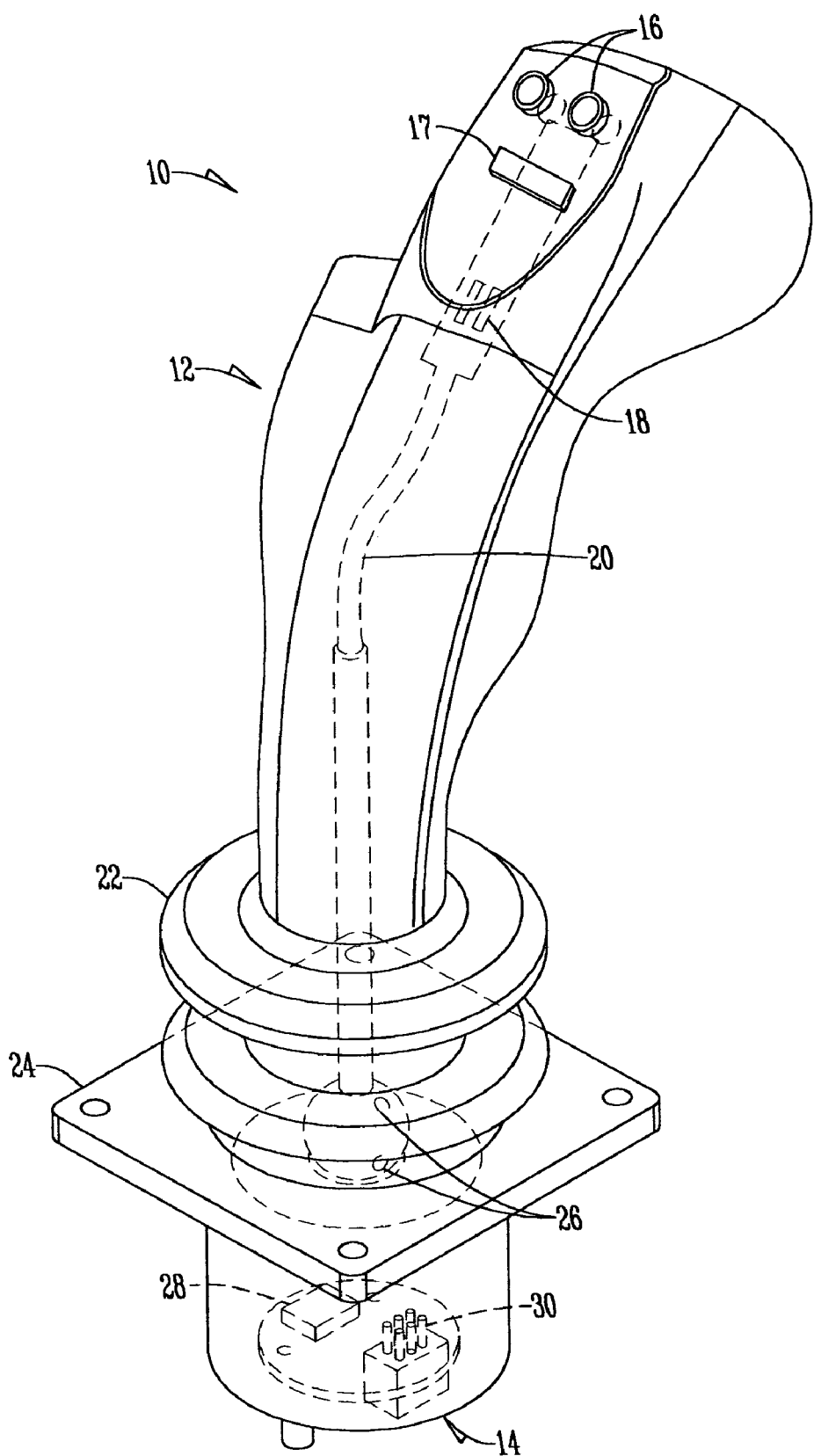
FIG. 1 is a perspective view of the joystick device of the present invention.
Figure 2:
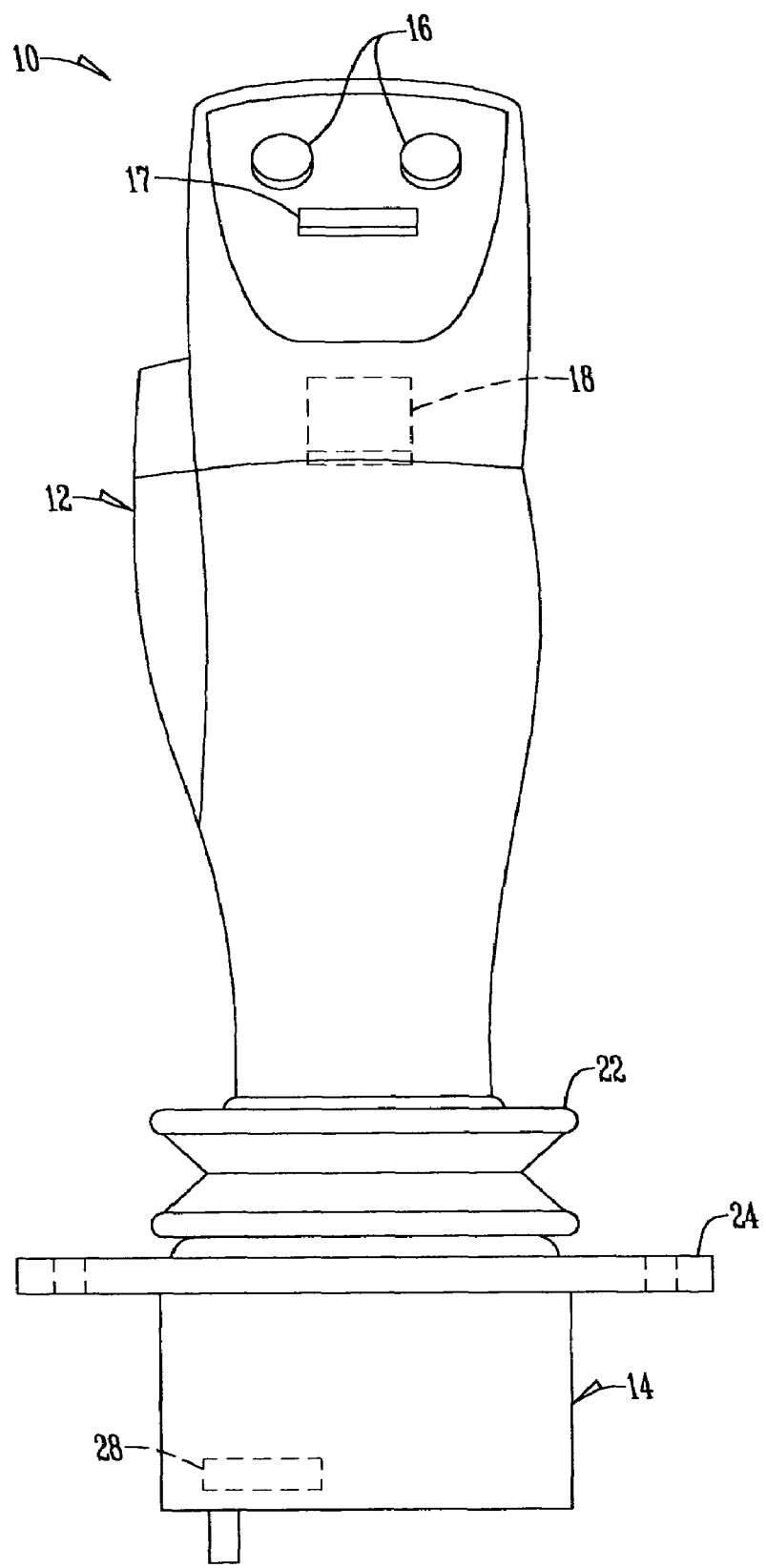
FIG. 2 is a front view of the joystick device of FIG. 1.
Figure 3:
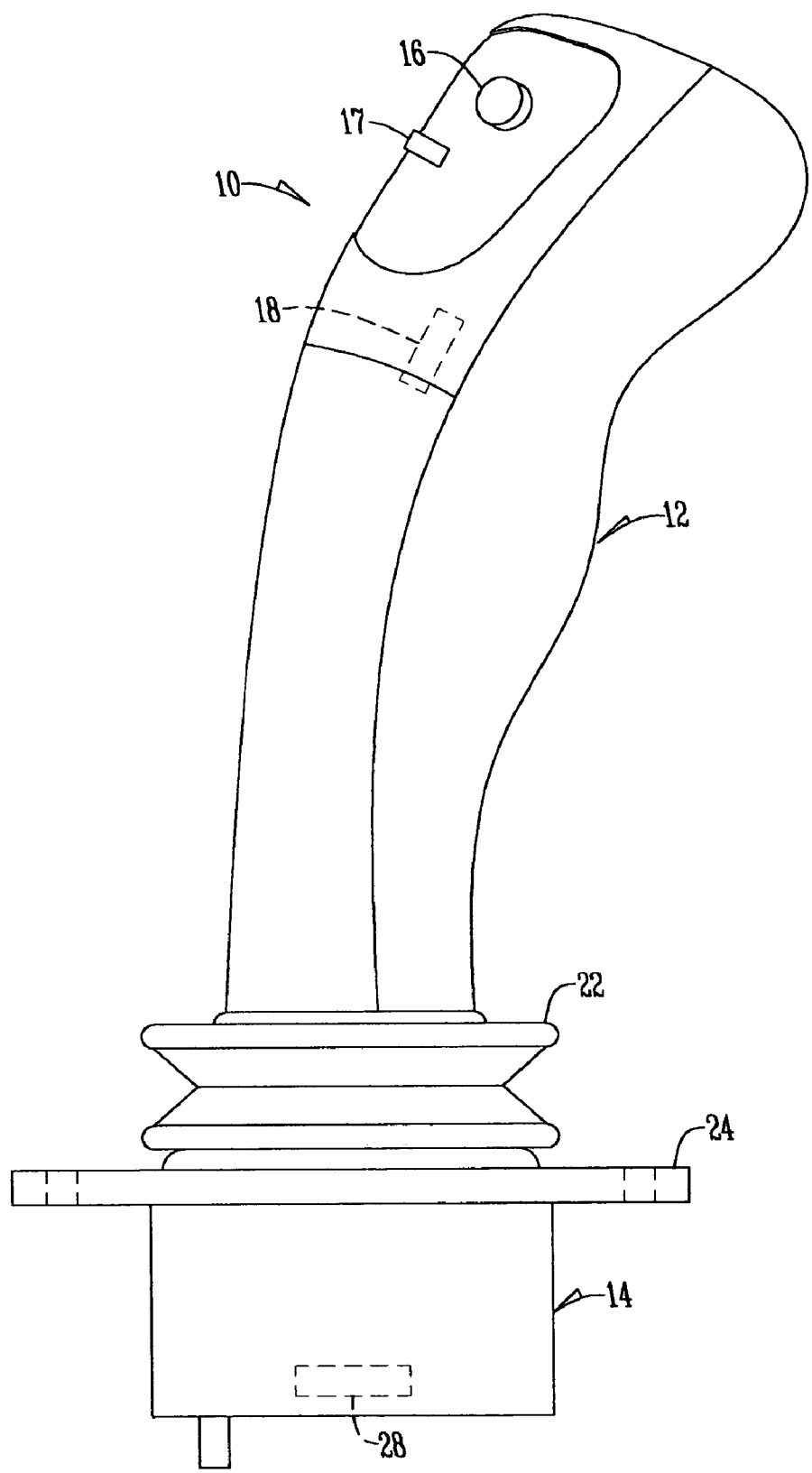
FIG. 3 is a side view of the joystick device of FIG. 1.

With reference to the drawings, a joystick device 10 is disclosed and includes a grip assembly 12 that is pivotally connected to a base assembly 14. The grip assembly 12 has a shape that accommodates an operator's hand according to the specific application.

The grip assembly 12 includes one or more input buttons 16 for use in controlling specific functions. The input buttons 16 are preferably digital inputs. Alternatively, the input may be proportional or analog inputs 30.

A microprocessor 18 is disposed within the grip assembly 12. The microprocessor 18 is in electronic communication with input buttons 16 and interconnect device 20. The microprocessor 18 receives signals from the input buttons 16 and outputs a single serial communication stream to the interconnect device 20. The serial communication stream is of a standard architecture, such as RS232 or CAN, but may include any custom designed scheme.

The grip assembly 12 is pivotally connected to the base assembly 14 via a flexible portion 22. The flexible portion 22 allows the grip assembly 12 to pivot front to back and side to side with respect to the base assembly 14.

The base assembly 14 includes a mounting plate 24 which permits the joystick device 10 to be secured to any location desired by the operator.

Sensing elements 26 are disposed within the base assembly 14. Sensing elements 26 detect movement of the grip assembly 12 as it pivots about the base assembly 14.

A microprocessor 28 is disposed within the base assembly 14. The microprocessor 28 is in electronic communication with the grip microprocessor 18 via the interconnect device 20, the sensing elements 26, and a remotely located main controller (not shown). The microprocessor 28 transmits a single serial communication stream to the remotely located main controller, which is used to drive control actuators (not shown) and other devices that control the function of the heavy machinery. The serial communication stream is of a standard architecture, such as RS232 or CAN, but may include any custom designed scheme.

An external interconnect device 30 is located on the base assembly 14 and is in electronic communication with the base microprocessor 28 and the remotely located main controller. Specifically, a cable (not shown) engages with the external interconnect device 30 and connects the joystick device 10 to the remotely located main controller.

In operation, the joystick device 10 is mounted within reach of an operator and is used to control the movement of heavy machinery and the like. The operator grasps the joystick device 10 and affects the movement of the heavy machinery depending upon the operator's inputs. As desired, the operator triggers one or more of the input buttons 16 and 30, which send data signals to the grip microprocessor 18. The grip microprocessor 18 transfers the signals from the input buttons 16 as a single serial communication stream to the base microprocessor 28 via the interconnect device 20. Also as desired, the operator pivots the grip assembly 12 with respect to the base assembly 14, thereby triggering output signals from the sensing elements 26. The base microprocessor 28 receives the signals from the sensing elements 26 as well as the serial communication stream from the grip microprocessor 18 via the interconnect device 20 for processing an output signal. The base microprocessor transmits a single serial communication stream to the remotely located main controller via the external interconnect device 30 and associated cables. Based upon the operator's manipulation of the joystick device 10, the main controller controls and drives control actuators (not shown) and other devices that control the heavy machinery.

It should be noted that the joystick device 10 may be operated without the grip microprocessor 18. In this arrangement, the input buttons 16 are connected directly to the base microprocessor 28, which receives inputs from the input buttons 16 and sensing elements 26 and transmits a single serial communication stream to the remotely located main controller, which drives control actuators (not shown) and other devices that control the heavy machinery.

Additionally, the base microprocessor 28 may directly drive the control actuators (not shown) and other devices that control the heavy machinery. In this arrangement, the base microprocessor 28 transmits an output signal directly to the control actuators and other devices that control the heavy machinery.

It is therefore seen that by the use of a plurality of microprocessors in electrical communication with all of the input buttons and sensing elements, this invention permits for a single serial communication serial to be transferred from the joystick device to the remotely located main controller.

What is claimed is:

1. A joystick device in electronic communication with a remotely located main electronic controller, the joystick device comprising:
    a base assembly having a first microprocessor in electronic communication with the main electronic controller;
    a grip assembly pivotally connected to the base assembly;
    a second microprocessor disposed within the grip assembly;
    an interconnect device in electric communication with the first microprocessor; and
    wherein the first microprocessor communicates with the second microprocessor via the interconnect device.

2. The joystick device of claim 1 further comprising input buttons on the grip assembly.

3. The joystick device of claim 1 further comprising input buttons on the grip assembly in electronic communication with the second microprocessor.

4. The joystick device of claim 1 further comprising sensing elements for detecting movement of the joystick device.

5. The joystick device of claim 4 wherein the sensing elements are disposed within the base assembly.

6. The joystick device of claim 4 wherein the sensing elements are in electronic communication with the first microprocessor.

7. A joystick device in electronic communication with a remotely located control actuator, the joystick device comprising:
    a base assembly having a first microprocessor in electronic communication with the control actuator;
    a grip assembly pivotally connected to the base assembly; and
    a second microprocessor disposed within the grip assembly and in electronic communication with the first microprocessor via an interconnect device.

8. The joystick device of claim 7 further comprising input buttons on the grip assembly.

9. The joystick device of claim 7 further comprising input buttons on the grip assembly in electronic communication with the second microprocessor.

10. The joystick device of claim 7 further comprising sensing elements for detecting movement of the joystick device.

11. The joystick device of claim 10 wherein the sensing elements are disposed within the base assembly.

12. The joystick device of claim 10 wherein the sensing elements are in electronic communication with the first microprocessor.

* * * * *